(12) United States Patent
Narevicius et al.

(10) Patent No.: US 7,321,705 B2
(45) Date of Patent: Jan. 22, 2008

(54) METHOD AND DEVICE FOR OPTICAL SWITCHING AND VARIABLE OPTICAL ATTENUATION

(75) Inventors: Edvardas Narevicius, Sunnyvale, CA (US); Ilya Vorobeichik, Sunnyvale, CA (US); Yoav Berlatzky, Haifa (IL); Romanas Narevich, Mountain View, CA (US)

(73) Assignee: Optun (BVI) Ltd., Tortola (VG)

( * ) Notice: Subject to any disclaimer, the term of this patent is extended or adjusted under 35 U.S.C. 154(b) by 95 days.

(21) Appl. No.: 10/515,768

(22) PCT Filed: May 28, 2003

(86) PCT No.: PCT/IL03/00444

§ 371 (c)(1),
(2), (4) Date: Nov. 24, 2004

(87) PCT Pub. No.: WO03/100485

PCT Pub. Date: Dec. 4, 2003

(65) Prior Publication Data

US 2005/0226552 A1    Oct. 13, 2005

Related U.S. Application Data

(60) Provisional application No. 60/383,326, filed on May 28, 2002, provisional application No. 60/383,325, filed on May 28, 2002.

(51) Int. Cl.
*G02B 6/35* (2006.01)
(52) U.S. Cl. .......................... 385/17; 385/16
(58) Field of Classification Search .................. 385/16, 385/17
See application file for complete search history.

(56) References Cited

U.S. PATENT DOCUMENTS

| 4,906,064 A | * | 3/1990 | Cheung ........................ 385/16 |
| 5,418,868 A | | 5/1995 | Cohen et al. |
| 5,574,808 A | | 11/1996 | van der Tol |
| 5,611,007 A | | 3/1997 | Wolf et al. |

(Continued)

FOREIGN PATENT DOCUMENTS

EP    0513919    11/1992

(Continued)

OTHER PUBLICATIONS

U.S. Appl. No. 10/515,927, filed Nov. 24, 2004, Narevicius.

(Continued)

*Primary Examiner*—Michelle R. Connelly-Cushwa
(74) *Attorney, Agent, or Firm*—Pearl Cohen Zedek Latzer, LLP (57) ABSTRACT

An optical switching device for switching M input signals into N output signals, wherein M and N are each equal to or greater than one, including a mode division multiplexer to join the M input signals into a first multi-mode signal having M initial modes, a mode converter to convert the first multi-mode signal into a second multi-mode signal having N converted modes, and a mode division demultiplexer to separate the second multi-mode signal into the N output signals, wherein the converter is able to be controllably activated such that the N converted modes are separated by the demultiplexer to the N output signals according to a desired scheme.

25 Claims, 8 Drawing Sheets

U.S. PATENT DOCUMENTS

| | | | |
|---|---|---|---|
| 5,623,566 | A | 4/1997 | Lee et al. |
| 5,703,977 | A | 12/1997 | Pedersen |
| 5,907,647 | A | 5/1999 | Eggleton et al. |
| 5,915,050 | A | 6/1999 | Russell et al. |
| 6,084,992 | A | 7/2000 | Weber et al. |
| 6,292,597 | B1 * | 9/2001 | Lagali et al. .............. 385/1 |
| 6,343,165 | B1 * | 1/2002 | Kim et al. ................. 385/28 |
| 6,574,391 | B2 * | 6/2003 | Augustsson .............. 385/24 |
| 2002/0168129 | A1 | 11/2002 | Gruber et al. |
| 2002/0176131 | A1 | 11/2002 | Walters et al. |
| 2002/0191886 | A1 | 12/2002 | Castoldi et al. |
| 2003/0012509 | A1 | 1/2003 | Chang et al. |
| 2003/0039430 | A1 | 2/2003 | Deliwala |
| 2005/0157979 | A1 | 7/2005 | Vorobeichik et al. |

FOREIGN PATENT DOCUMENTS

| | | |
|---|---|---|
| EP | 0645650 | 3/1995 |
| WO | WO 03/100507 | 12/2003 |

OTHER PUBLICATIONS

Vance, et al, "Asymmetric Adiabatic Multiprong for Mode Multiplexed Systems", Electronics Letters, vol. 29, Nov. 25, 1993, pp. 2134-2136.

Shani, et al., "Integrated Optic Adiabatic Devices on Silicon", IEEE Journal of Quantam Ekectrinocs, vol. 27, No. 3, Mar. 1991, pp. 556-566.

Burns et al., "Active Branching Waveguide Modulator", Applied Physics Letters, vol. 29, No. 12, Dec. 15, 1976, pp. 790-792 (1976).

Sasaki et al., "Theoretical and Experimental Studies Active Y-Junctions in Optical Waveguides", IEEE Journal of Quantam Electronics, vol. QE-14, No. 11, Nov. 1978, pp. 883-892.

Haruna et al., "Thermo-Optic Deflection and Switching in Glass", Applied Optics, vol. 21, No. 19, Oct. 1, 1982, pp. 3461-3465.

Gokhberg, et al., Solution of the Vector Wave Equation by the Separable Effective Adiabatic Basis Set Method, J. Opt. Soc. Am., vol. 21, No. 10, Oct. 2004. pp. 1809-1817.

Burns et al., "Waveguide Transitions and Junctions", in "Guided-wave Optoelectronics", Edited by T. Tamir, Berlin, New York: Springer-Verlag (1990).

Narevich, et al., Optical Switching Based on the Adiabatic Temperature Induced Mode Localization, IEEE, 2003, pp. 128-129.

Besse et al., Phase Relations in Multi-Mode Interference Couplers and their Application to Generalized Integrated Mach-Zehnder Optical Switches, Proceedings European Conference on Integrated Optics with Technical Exhibition, 1993, pp. 1-4.

Nagai et al., "Multimode Interference Photonic Switches (MIPS)", Journal of Lightwave Technology, IEEE, New York, US, vol. 20, No. 4, Apr. 4, 2002, pp. 675-681.

International Search Report for PCT/IL03/00444 dated Dec. 4, 2003.

* cited by examiner

METHOD AND DEVICE FOR OPTICAL SWITCHING AND VARIABLE OPTICAL ATTENUATION

CROSS-REFERENCE TO RELATED APPLICATIONS

This application is a National Phase Application of PCT International Application No. PCT/IL2003/000444, International Filing Date May 28, 2003, claiming priority of U.S. Provisional Patent Applications, 60/383,326, filed May 28, 2002, and 60/383,325, filed May 28, 2002.

FIELD OF THE INVENTION

The invention relates to the switching of optical signals between alternate waveguides, such as optical fibers

BACKGROUND OF THE INVENTION

In the field of integrated optics, there may be a need to use a switch, e.g., to route signals and/or to add or subtract signal-carrying lines.

U.S. Pat. No. 5,915,050 to P. Russell, et al describes an optical device including an optical fiber directional coupler supporting at least two possible electromagnetic transmission modes. An acousto-optic effect is used to create a spatial periodic perturbation, which allows power transfer between the transmission modes.

U.S. Pat. No. 5,418,868 to Cohen et al describes a thermally active optical device based on a Mach Zehnder Interferometer (MZI) optically coupled to an adiabatic 3 dB input coupler and an adiabatic 3 dB output coupler. One arm of the MZI includes a thermo-optical phase shifter. The thermo-optical phase shifter may be used to control the distribution of transmitted light at the output of the device.

A dynamic device is defined as a device in which an optical property of the device may be altered, e.g., the device may be turned on/off and/or a refractive index of the device may be changed. A passive device is defined as a device in which all optical properties are pre-determined and depend only on a power distribution of a light injected into the device.

SUMMARY OF THE INVENTION

According to embodiments of the invention, an optical switch is provided for switching M input signals into N output signals, wherein M and N are equal to or greater than one. The switch may include a Mode Division Demultiplexer (MDM) to join the M input signals into a first multi-mode (MM) signal having M initial modes. The switch may additionally include a Mode Converter (MC) to convert the first MM signal into a second MM signal having N converted modes. The switch may also include a Mode Division Demultiplexer (MDD) to separate the second MM signal into the N output signals. According to embodiments of the invention, the MC may be controllably activated such that the N converted modes are separated by the demultiplexer into the N output signals according to a desired scheme.

According to embodiments of the invention, the switch may include an "off" state and at least one "on" state of operation.

According to exemplary embodiments of the invention, the MDM may have an output and M inputs associated with M single-mode (SM) input waveguides, respectively. The output of the MDM may be associated with an input of the MC by a first MM waveguide. An output of the MC may be associated with an input of the MDD by a second MM waveguide. The MDD may have N outputs associated with N SM output waveguides.

According to some exemplary embodiments of the invention, the MC may include a dynamic MC having a long period grating (LPG). In some embodiments, the dynamic MC may be selectively controlled to convert a desired fraction of a signal from a first guided mode to a second guided mode.

According to additional exemplary embodiments of the invention, the MC may include an adiabatic interferometer based MC.

According to other exemplary embodiments of the invention, the MC may include a splitter-based MC.

Some exemplary embodiments of the invention provide a Variable Optical Attenuator (VOA) implemented by a switch, for example, a switch as described herein, associated with one input waveguide and one output waveguide. According some embodiments of the invention, the VOA may be implemented as a "normally bright" VOA, wherein the switch transmits light signals from the input waveguide to the output waveguide substantially un-attenuated when the switch is at the "of" state. According to other embodiments, the VOA may be implemented as a "normally dark" VOA, wherein the switch substantially blocks the light signal from being transmitted from the input waveguide to the output waveguide when at the "off" state.

According to some embodiments of the invention, the MC may include a plurality of cascaded sub-mode converters, wherein each mode converter controls switching between at least one different pair of modes Some exemplary embodiments of the invention provide a 2×2 switch adapted for switching between two input signals and two output signals According to these embodiments, M and N each equal two and the MC is adapted to convert between two-order modes, e.g., a fundamental mode and a first-order mode.

According to another embodiment of the invention, an optical 2×2 switch may include two SM input waveguides, a Y coupling branch structure, a first MM waveguide, a MDD, two SM MD waveguides, two controllable phase shifters, e.g., heating elements, a MDM, a second MM waveguide, a splitting Y-branch structure, and two SM output waveguides.

According to a further embodiment of the invention, a method is provided for switching M input signals into N output signals. The method may include joining M input signals into a first MM signal having M initial modes. The method may additionally include converting the first MM signal into a second MM signal having N converted modes. The method may further include separating the second MM signal into N output SM signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Figure 1:
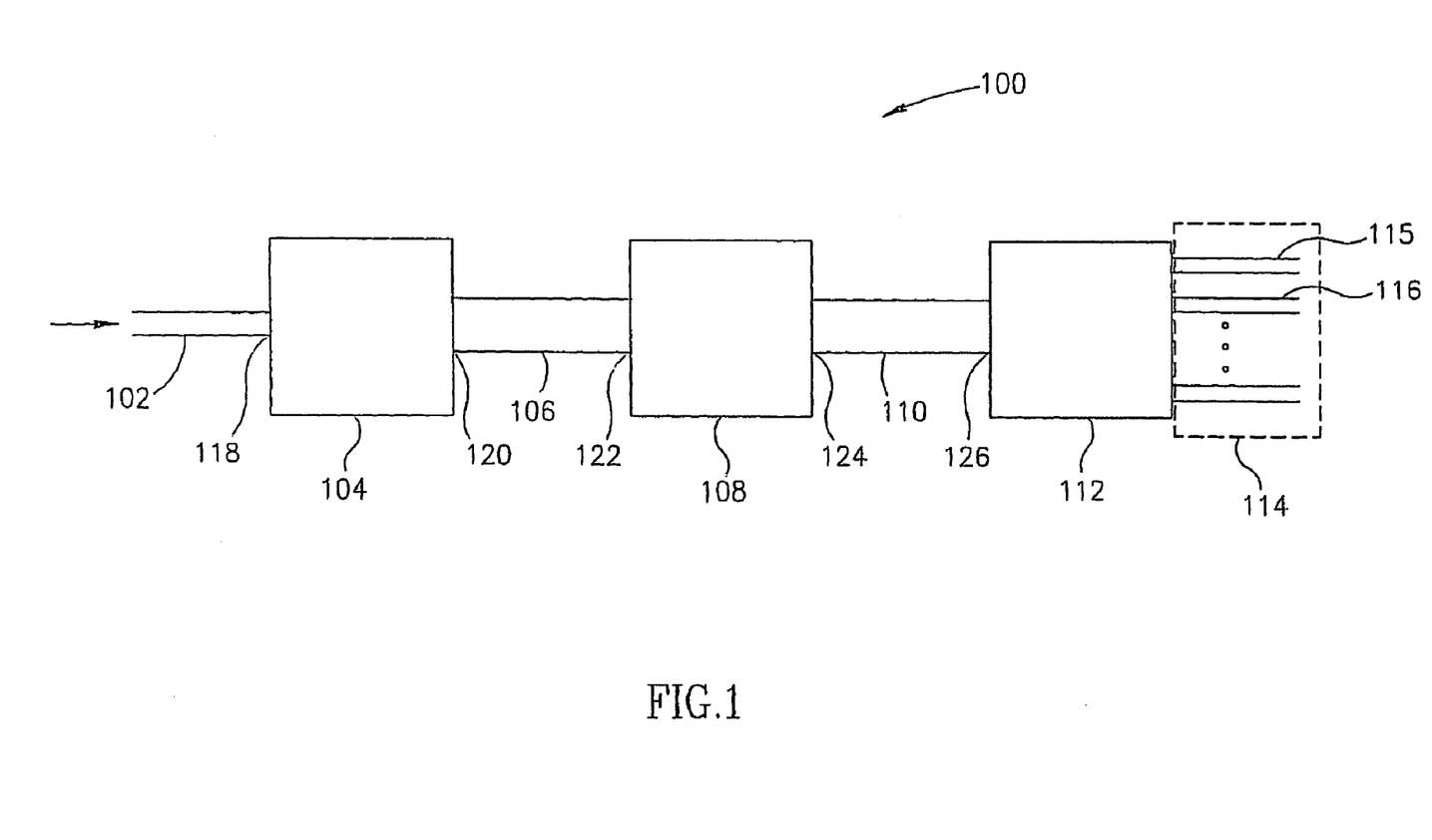
FIG. 1 is a schematic illustration of a planar structure of a 1×N optical switch in accordance with some exemplary embodiments of the present invention.

Reference is made to FIG. 1, which schematically illustrates a planar structure of a 1×N optical switch 100 in accordance with some exemplary embodiments of the present invention.

According to embodiments of the invention, 1×N optical switch 100 may include a Single Mode (SM) input waveguide 102, a passive waveguide expander 104, a first Multi-Mode (MM) waveguide 106, a dynamic Mode converter (MC) 108, a second MM waveguide 110 and a passive Mode Division Demultiplexer (MDD) 112 including N output waveguides 114, wherein N is equal to or greater than one.

According to exemplary embodiments of the invention, a SM light signal may enter an input 118 of expander 104 via input waveguide 102. Passive expander 104 may convert the SM signal into an initial MM signal exiting expander 104 at an output 120. The initial MM signal may propagate via MM waveguide 106 and enter an input 122 of MC 108 Dynamic MC 108 may be used to convert the initial MM signal into a converted MM signal exiting MC 108 at an output 124. The converted MM signal may propagate via MM waveguide 110 and enter an input 126 of MDD 112. Passive MDD 112 may be adapted to separate each mode of order j of the converted MM signal into a corresponding output SM waveguide 114 supporting the mode of order j. According to embodiments of the invention, MC 108 may be selectively controlled to convert the initial MM signal into the converted MM signal such that MDD 112 may separate each mode of order j into a desired output waveguide 114. Thus, switching of the input signal to any one of output waveguides 114 may be controlled by selectively controlling a relationship between the initial MM signal and the converted MM signal, using the MC 108, such that the converted signal includes the mode of order j corresponding to the desired output 114 of MDD 112, as described below.

According to embodiments of the invention, dynamic MC 108 may operate in conjunction with MM waveguides 106 and 110, respectively, and may have at least two states of operation, e.g., at least one "On" state and an "Off" state. When the MC is at the "Off" state, a mode of order i enters the MC and the same mode of order i exits the MC. When MC 108 is switched to the "On" states, a mode of order i entering the MC is at least partially converted into a mode of order j that exits the MC.

According to embodiments of the invention, optical switch 100 may have at least two states of operation, e.g., at least one "On" state and an "Off" state, which may correspond, for example, to the states of operation of MC 108. When MC 108 is at the "off" state, a signal entering the switch from SM input waveguide 102 may exit the switch via a predetermined output waveguide, e.g., waveguide 115, without being affected by the switch.

When the MC is switched to the "on" states, it may allow converting a fundamental mode of the entering signal, into a certain high-order mode, e.g., a second-order mode, such that the MDD may separate the signal, according to a desired scheme, into a desired waveguide of output waveguides 114, e.g., waveguide 116.

According to an exemplary embodiment of the invention, switch 100 may be a 1×2 switch, in which case MC 108 may have one "on" state of operation, to switch between two optical modes, for example, a fundamental mode and a higher-order mode, e.g., a first-order mode. According to this embodiment, the MDD may separate the fundamental mode into a first predetermined output waveguide, and the higher-order mode into a second predetermined output waveguide.

According to embodiments of the invention, passive waveguide expander 104 may include any suitable waveguide expander known in the art, and may transform a mode of order i received from a SM waveguide into a corresponding mode of a different shape, e.g., a single mode with the same mode-order i, adapted to propagate in a MM waveguide.

According to exemplary embodiments of the invention, passive expander 104 may be used to expand an initial mode of SM waveguide 102 into an initial mode of MM waveguide 106, as described above.

According to embodiments of the invention, MDD 112 may include any demultiplexing device adapted to separate at least one mode of a MM signal propagating through a MM waveguide into at least one SM waveguide, respectively.

According to embodiments of the invention MDD 112 may include, for example, a MDD as described in the International Application titled "Method and Apparatus for Optical Mode Division Multiplexing and Demultiplexing", filed under the Patent Cooperation Treaty (PCT) concurrently with the present application, assigned to the assignee of the present application, the disclosure of which is incorporated herein by reference in its entirety.

Figure 2A:
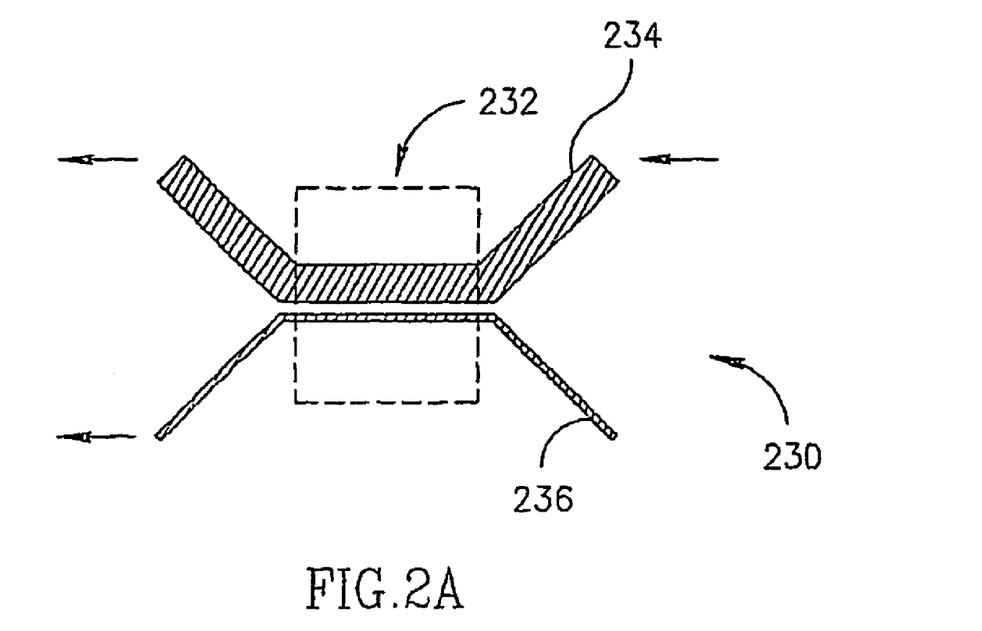
FIG. 2A is a schematic illustration of a MM directional coupler that may be used in conjunction with exemplary embodiments of the invention.

Reference is also made to FIG. 2A, which schematically illustrates a MM directional coupler 230 that may be used in conjunction with exemplary embodiments of the invention.

According to embodiments of the invention, MM directional coupler 230 may include a MM waveguide 234, a SM waveguide 236, and a coupling region 232. Coupling region 232 may allow coupling a desired mode of a MM signal from MM waveguide 234 to SM waveguide 236. According to these embodiments, coupling region 232 may support at least three modes, including the desired mode and at least two other modes of the MM signal. Coupling region 232 may include respective portions of waveguide 234 and waveguide 236 located in proximity to one another. In these proximal portions, an effective refractive index of the SM signal may be substantially equal to an effective refractive index of one of the modes of the MM signal A coupling efficiency of coupling region 232 may depend on a periodic function, e.g., the square of the sine, of a length of the coupling region. Thus, there may be at least one optimal coupling length that provides high coupling efficiency, while the coupling efficiency for different lengths of the coupling region, e.g., longer or shorter, the coupling efficiency may be relatively lower.

Figure 2B:
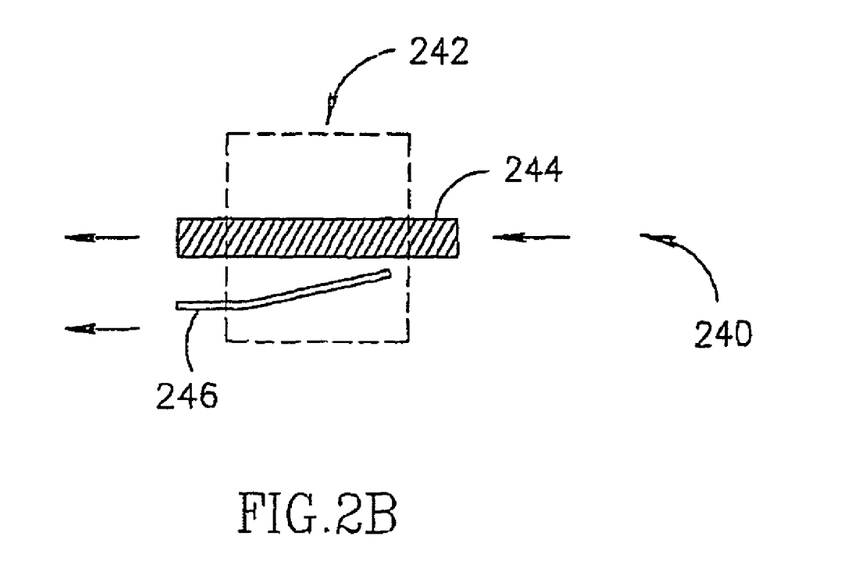
FIG. 2B is a schematic illustration of an adiabatic mode demultiplexer that may be used in conjunction with exemplary embodiments of the invention.

Reference is also made to FIG. 2B, which schematically illustrates an adiabatic mode demultiplexer 240 that may be used in conjunction with exemplary embodiments of the invention.

According to embodiments of the invention, adiabatic mode demultiplexer 240 may include a coupling region 242. Coupling region 242 may include portions of a MM waveguide 244 and a SM waveguide 246. According to these embodiments, adiabatic mode demultiplexing may be achieved by adiabatically, e.g., gradually, varying the effective indexes of the modes of waveguides 244 and 246 along coupling region 242, e.g., by appropriately designing the geometric dimensions of waveguides 244 and/or 246. Region 242 may provide adiabatic demultiplexing, such that a coupling efficiency of coupling region 242 may be incrementally dependent on a length of the coupling region, e.g., a longer coupling region may provide a higher coupling efficiency. Thus, the coupling efficiency of region 242 may be substantially insensitive to fabrication errors.

Although the above description of FIGS. 2A and 2B relates to separating one mode of a MM signal to yield one SM signal, it may be understood by a person skilled in the art, that the devices including components of the devices of FIG. 2A and/or FIG. 2B may be implemented for separating more than one mode of a MM signal to yield more than one SM signal, respectively. This may be achieved, for example, by cascading a plurality of MM couplers and/or adiabatic demultiplexers, as described above, such that each one of the devices may separate one different mode of the MM signal to a respective SM signal.

According to embodiments of the invention, a MDD having a low level of cross-talk and/or a relatively high sensitivity to mode-order may be implemented to improve the separation between the modes switched by switch 100.

According to embodiments of the invention, MC 108 may include any device to produce mode conversion as described above, e.g., a splitter-based MC, as described below, or a long period grating (LPG) based MC, for example, a mode converter as described in the International Application titled "Method and Apparatus for Optical Mode Conversion", filed under the PCT concurrently with the present application, assigned to the assignee of the present application, the disclosure of which is incorporated herein by reference in its entirety. MC 108 may also include an adiabatic interferometer-based MC, for example, as described in the International Application titled "Method and apparatus for influencing a light signal", filed under the PCT concurrently with the present application, assigned to the assignee of the present application, the disclosure of which is incorporated herein by reference in its entirety.

Figure 2C:
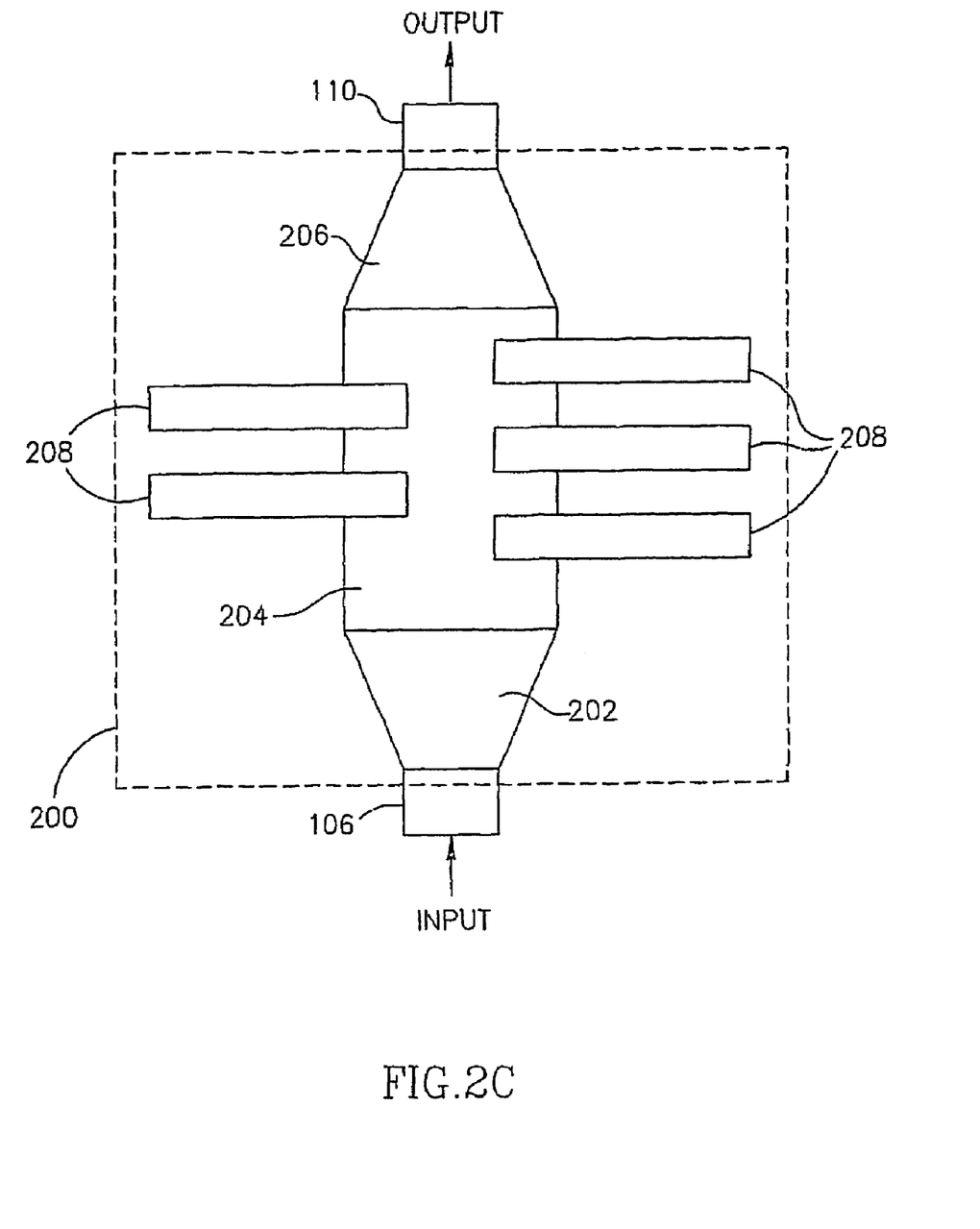
FIG. 2C is a schematic illustration of a long period grating mode converter that may be used in conjunction with exemplary embodiments of the invention.

Reference is now made to FIG. 2C, which schematically illustrates a LPG mode converter 200 that may be used in conjunction with exemplary embodiments of the invention.

According to exemplary embodiments of the invention, LPG based MC 200 may include an input section 202 associated with MM waveguide 106 (FIG. 1), a dynamic waveguide section 204, an output section 206 associated with MM waveguide 110 (FIG. 1) and a plurality of control elements 208, for example, a plurality of heating elements that, when activated, are able to change the refractive index of respective regions of dynamic section 204. Input section 202 and output section 206 may each include an adiabatically shaped, e.g., tapered, waveguide. Control elements 208 may be arranged in a configuration that, when activated, is able to create a periodic refractive index perturbation pattern along dynamic waveguide section 204. This perturbation pattern may enable conversion of a propagating light signal between two guided modes.

Figure 2D:
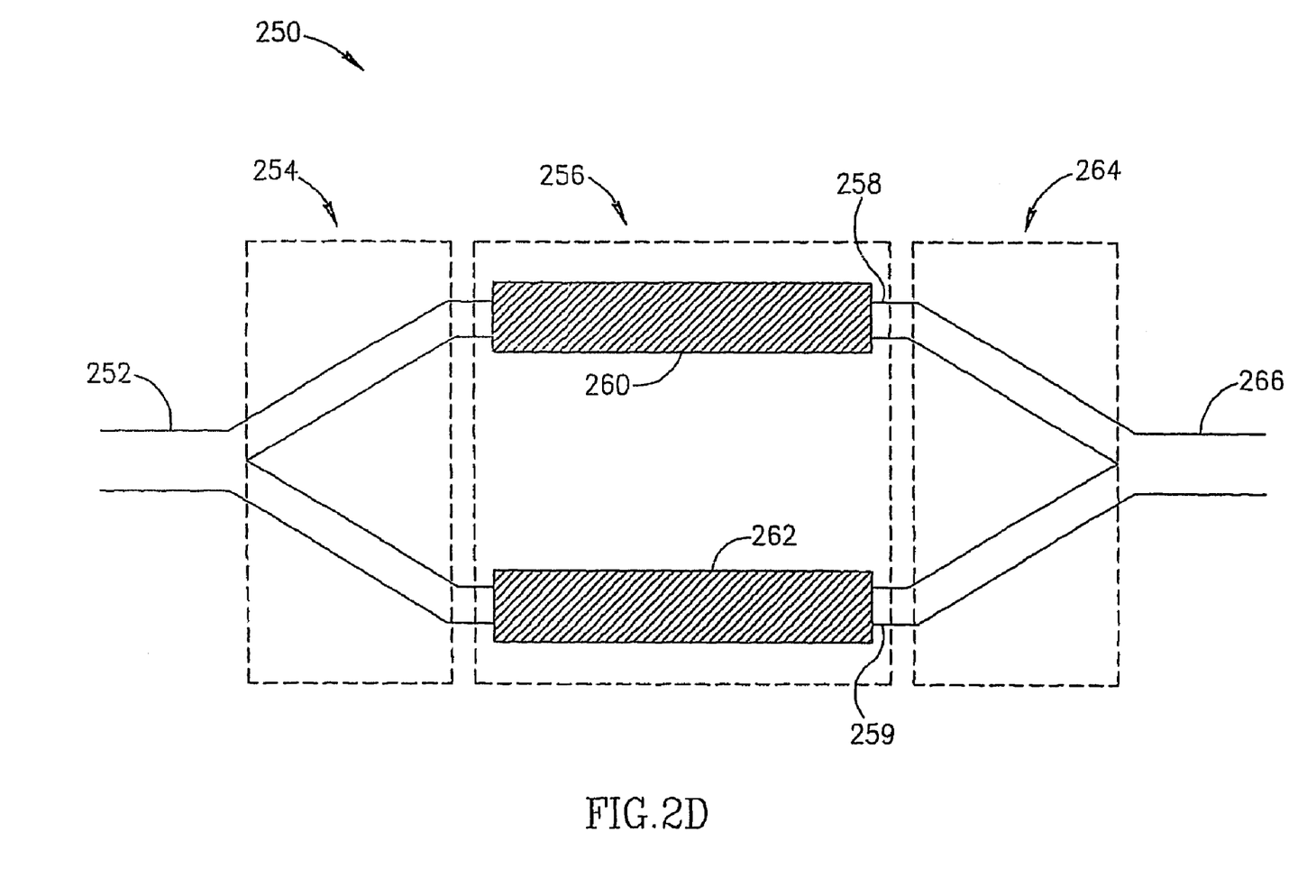
FIG. 2D is a schematic illustration of a splitter-based mode converter that may be used in conjunction with exemplary embodiments of the invention.

Reference is now made to FIG. 2D, which schematically illustrates a splitter-based mode converter 250 that may be used in conjunction with some exemplary embodiments of the invention.

According to embodiments of the invention, MC 250 may include an input MM waveguide section 252, a beam splitter 254, e.g. a 3 dB splitter, a conversion section 256, a beam combiner 264, e.g., a 3 dB combiner, and an output MM waveguide section 266.

According to embodiments of the invention, an input MM signal entering MM waveguide 252 may be split by beam-splitter 254 into a first component and a second component propagating through a first waveguide 258 and a substantially parallel second waveguide 259, respectively. A first controllable phase shifter, e.g., a heating element 260, associated with waveguide 258, and a second controllable phase shifter, e.g. a heating element 262, associated with waveguide 259, may be controllably activated to create a phase difference between the first component and the second component. Subsequently, the first and second components may be combined, by combiner 264, into a MM output signal exiting waveguide 266. By controllably activating phase shifters 260 and 262, controllable mode conversion of at least a fraction of a first mode-order of the input MM signal into a second mode-order of the output signal may be achieved.

Figure 3:
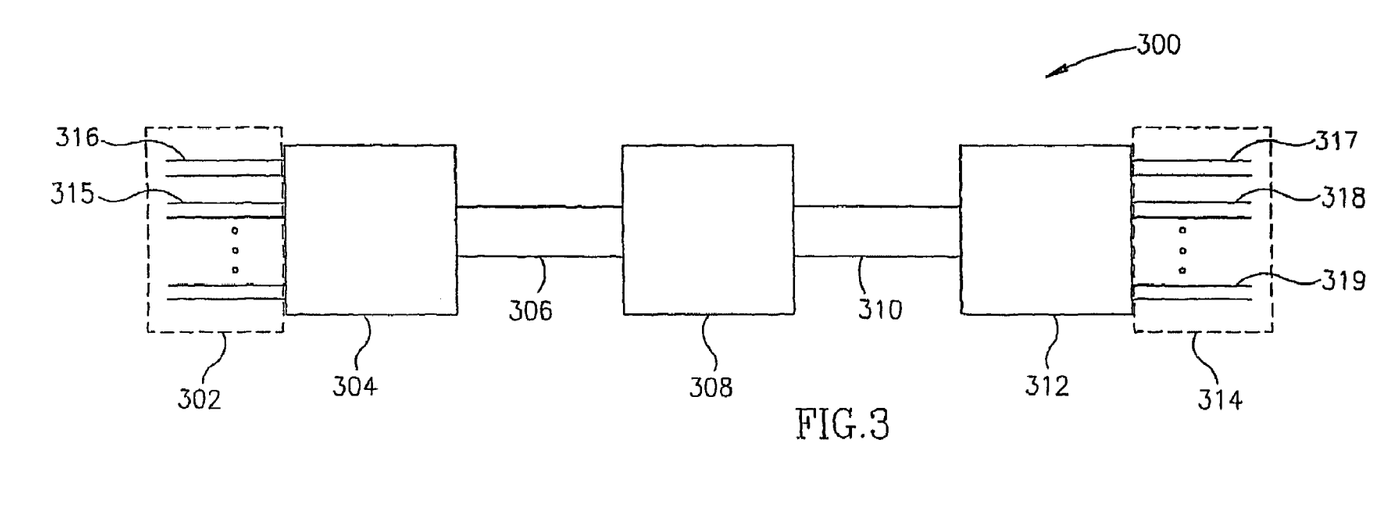
FIG. 3 is a schematic illustration of a planar structure of a M×N optical switch in accordance with exemplary embodiments of the present invention.
Figure 4:
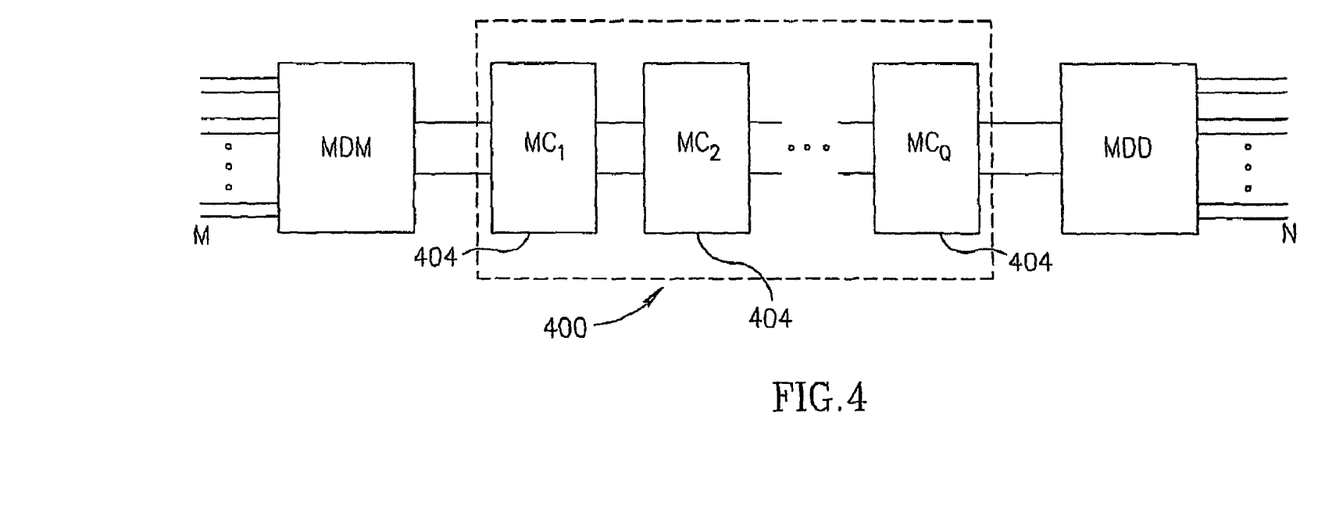
FIG. 4 is a schematic illustration of a cascade of sub mode converters, in accordance with exemplary embodiments of the present invention.

Reference is now made to FIG. 3, which schematically illustrates a planar structure of a M×N optical switch 300 in accordance with exemplary embodiments of the present invention, wherein M and N are both greater than one, and to FIG. 4, which schematically illustrates a cascade 400 of sub-MCs 404, in accordance with exemplary embodiments of the present invention.

According to embodiments of the invention, M×N optical switch 300 may include M SM input waveguides 302, a passive Mode Division Multiplexer (MDM) 304, a first MM waveguide 306 supporting at least M modes, a dynamic MC 308, a second MM waveguide 310, and a passive MDD 312 including N SM output waveguides 314.

According to embodiments of the invention, passive MDM 304 may include, for example, a MDM as described in the International Application titled "Method and Apparatus for Optical Mode Division Multiplexing and Demultiplexing", filed under the PCT concurrently with the present application, assigned to the assignee with of the present application.

According to embodiments of the invention, MDM 304 may include any suitable device that is able to join a plurality of input signals, from a plurality, M, of SM input waveguides 302, into an M-mode signal carried by MM waveguide 306, wherein each order mode carries a signal associated with a particular one of SM waveguides 302. For example, it will be appreciated by persons skilled in the art that either of the devices of FIG. 2A or 2B may be adapted, by reversing the direction of operation described above, to perform the desired function of MDM 304, wherein the input signal may include a SM signal and the output signal may include a MM signal.

According to embodiments of the invention, dynamic MC 308 may include any suitable dynamic MC, for example, a splitter-based MC, an adiabatic interferometer based MC, or a LPG MC, as described above. MC 308 may be used to controllably convert a signal carried by at least one of the M-modes of MM waveguide 306 into any mode of MM waveguide 310.

According to exemplary embodiments of the invention, MC 308 may include a cascade 400 of sub MCs 404, for example, Q sub MCs 404, wherein Q is less than or equal to N, and wherein each sub MC is capable of converting at least between one pair of different modes.

Passive MDD 312 may include any MDD as described above, and may be used to separate each mode of order j of MM waveguide 310 into a signal carried by a corresponding one of SM output waveguides 314.

According to embodiments of the invention, optical switch 300 may have at least two states of operation, e.g., at least one "On" state of operation and an "Off" state, which may correspond, for example, to the states of operation of MC 308. When MC 308 is at the "off" state, each one of input waveguides 302 may be associated with a respective one of output waveguides 314, e.g., input waveguide 316 may be associated with output waveguide 317, and input waveguide 315 may be associated with output waveguide 318.

When the MC is switched to the "On" states, MC 308 may convert at least some of the M modes of MM waveguide 306 into different-order modes, for example, such that MDD 310 may separate the MM signal into a plurality, N, of SM output signals, which may be carried by respective waveguides 314 in accordance with any desired scheme. According to exemplary embodiments of the invention, cascade 400 may be used to sequentially convert M modes into N modes to enable a desired M×N switching effect Thus, MC 308 may allow to switch between any desired input waveguide of M input waveguides 302 and any desired output waveguide of N output waveguides 314, e.g., input waveguide 315 may be associated with output waveguide 319, and input waveguide 316 may be associated with output waveguide 318.

According to some embodiments of the invention, switch 300 may be implemented as a Variable Optical Attenuator (VOA). This may be achieved by using only one input waveguide, for example one of input waveguides 302, and one output waveguide, for example, one of output waveguides 314, and operating the switch as described below.

According to some of these embodiments, switch 300 may be implemented as a "normally bright" VOA, wherein the switch transmits light signals from the input waveguide to the output waveguide substantially un-attenuated when at the "off" sale. This may be achieved by using the output waveguide, which may be associated with the input waveguide, when the switch is at the "off" state. Thus, when the switch is at the "off" state, no attenuation occurs. When the switch is switched to the "on" states, a controllable attenuation of the light signal may be achieved, by controlling MC 308, as described above.

According to other embodiments, switch 300 may be implemented as a "normally dark" VOA, wherein the switch substantially blocks the light signal from being transmitted from the input waveguide to the output waveguide when at the "off" state. This may be achieved by using the output waveguide, which may not be associated with the input waveguide when the switch is at the "off" state. Thus when the switch is at the "off" state, substantial full attenuation occurs. When the switch is at the "on" state, a controlled attenuation of the light signal may be achieved, by controlling MC 308.

According to exemplary embodiments of the invention, switch 300 may include a combination of MDM, MDD and MC components, as described above, each component having attributes according to a required configuration of the switch. According to these exemplary embodiments, two different MDDs and/or two different MDMs, for example, each having different signal separating attributes, may be used to configure two different switches, respectively, as described below.

Figure 5:
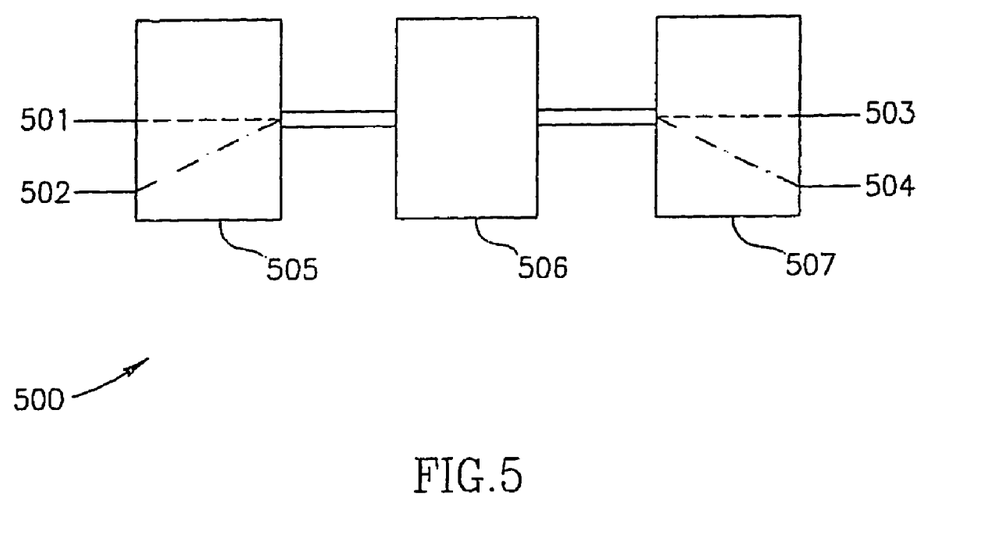
FIG. 5 is a schematic illustration of a 2×2 "normally bar" optical switch configuration in accordance with exemplary embodiments of the invention.
Figure 6:
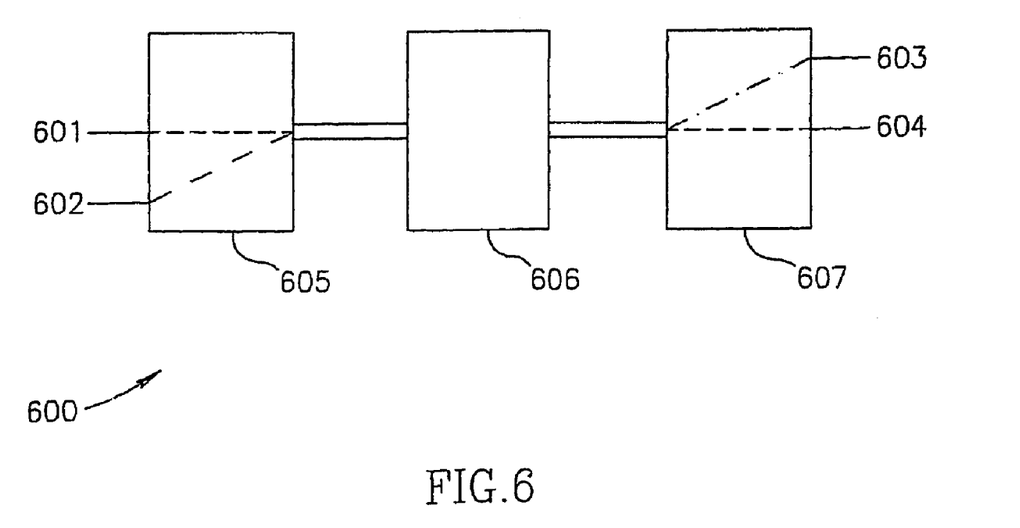
FIG. 6 is a schematic illustration of a 2×2 "normally cross" optical switch configuration in accordance with exemplary embodiments of the invention.

FIGS. 5 and 6 schematically illustrate a "normally bar" 500 configuration and a "normally cross" 600 configuration of a 2×2 optical switch, respectively, in accordance with further exemplary embodiments of the invention.

According to further exemplary embodiments of the invention, switch 500 may include a MDM 505 having two input ports, 501 and 502, respectively. An output of MDM 505 may be associated with and input of a MC 506, which may include, for example, any one of the mode converters described herein. An output of MC 506 may be associated with an input of a MDD 507 having two output ports, 503 and 504, respectively.

According to exemplary embodiments of the invention, switch 600 may include a MDM 605 having input ports 601 and 602. An output of MDM 605 may be associated with an input of a MC 606. An output of MC 606 may be associated with an input of a MDD 607 having two output ports 603 and 604.

According to exemplary embodiments, MC's 506 and 606 of switches 500 and 600, respectively, may operate between two optical modes, e.g., a fundamental mode and a first-order mode.

According to an exemplary embodiment of the invention, in "normally bar" configuration 500, the 2×2 switch may allow connection of input ports 501 and 502 with output ports 503 and 504, respectively. In the "normally cross" configuration 600, the 2×2 switch may allow switching between the ports, i.e., connecting input ports 601 and 602 with output ports 604 and 603, respectively.

In "normal bar" configuration 500, the MDM may be adapted to associate input ports 501 and 502 with the fundamental and first-order modes, respectively, of MC 506. The fundamental and first-order modes of MC 506 may correspond to a fundamental mode and a first-order mode, respectively, of MDD 507. The fundamental and first-order modes of MDD 507, in turn, may be associated with output ports 503 and 504, respectively.

In "normal cross" configuration 600, the MDM may be adapted to associate input ports 601 and 602 with the fundamental and first-order modes, respectively, of MC 606. The fundamental and first-order modes of MC 606 may correspond to a fundamental mode and a first-order mode, respectively, of MDD 607. The fundamental and first-order modes of MDD 607, in turn, may be associated with output ports 604 and 603, respectively.

Figure 7:
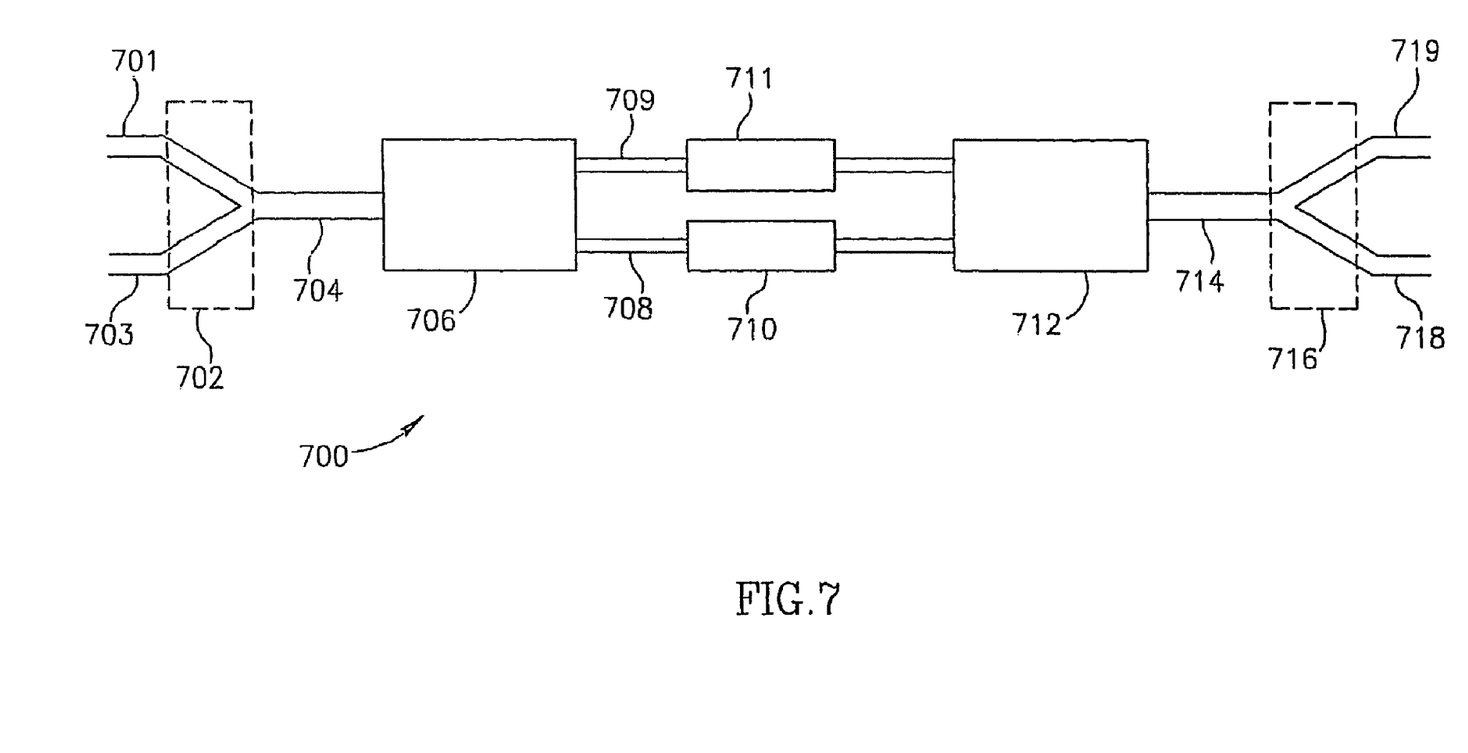
FIG. 7 is a schematic illustration of a planar structure of another 2×2 optical switch, in accordance with additional exemplary embodiments of the invention.

FIG. 7 schematically illustrates another 2×2 optical switch 700, in accordance with exemplary embodiments of the invention. Optical switch 700 may include two SM input waveguides, 701 and 703, a Y coupling branch structure 702, a first MM waveguide 704, a MD 706, two SM MD waveguides, 708 and 709, two controllable phase-shifters, 710 and 711, respectively, a MDM 712, a second MM waveguide 714, a splitting Y-branch structure 716, and two SM output waveguides, 718 and 719. According to embodiments of the invention, switch 700 may be operated, independently of passive MDD 706 and/or MDM 712 characteristics, in a "normally bar" configuration and/or a "normally cross" configuration, as described above.

According to embodiments of the invention, an input signal entering one of the input waveguides, e.g., waveguide 701, may be combined by structure 702 to an initial MM signal, propagating through MM waveguide 704, and including two mode orders, e.g., a zero-order mode and a first-order mode. MDD 706 may be used to drop the first-order mode and to enable two SM signals, each having substantially half of the power of the input signal, to exit MDD 706 and enter SM waveguides 708 and 709, respectively. Phase shifters 710 and 711 may include tunable control elements, e.g., heating elements that affect the propagation coefficients of the propagating signals, which may be controllably activated to create a predetermined phase difference between the two signals, for example, by differential heating. MDM may combine the two SM signals into one converted MM signal propagating through MM waveguide 714. Structure 716 may be used to direct the converted MM signal to one of waveguides 718 and 719, depending on the phase shift created between shifters 710 and 711.

According to exemplary embodiments of the invention, a zero phase difference between the signals may yield a "cross" state of switch 700 such that, for example, a signal entering waveguide 701 may exit the switch through waveguide 718. A phase shift of $\pi$ (pi) radians between the signals may yield a "bar" state of switch 700 such that, for example, a signal entering waveguide 701 may exit the switch through waveguide 719

According to some embodiments of the invention, switch 700 may be implemented as a VOA. This may be achieved by using only one input of the switch, e.g., input 701, and creating a predetermined phase shift of more than zero and less than $\pi$ radians, e.g., by controllably activating shifters 710 and 711, respectively, to tune the amount of phase-shifting applied to the signals. It will be appreciated by persons skilled in the art that tunable activation of shifters 710 may allow controlling an attenuation level of a signal entering input 701, and may also allow "normally dark" and/or "normally bright" attenuation, as described above.

Figure 8:
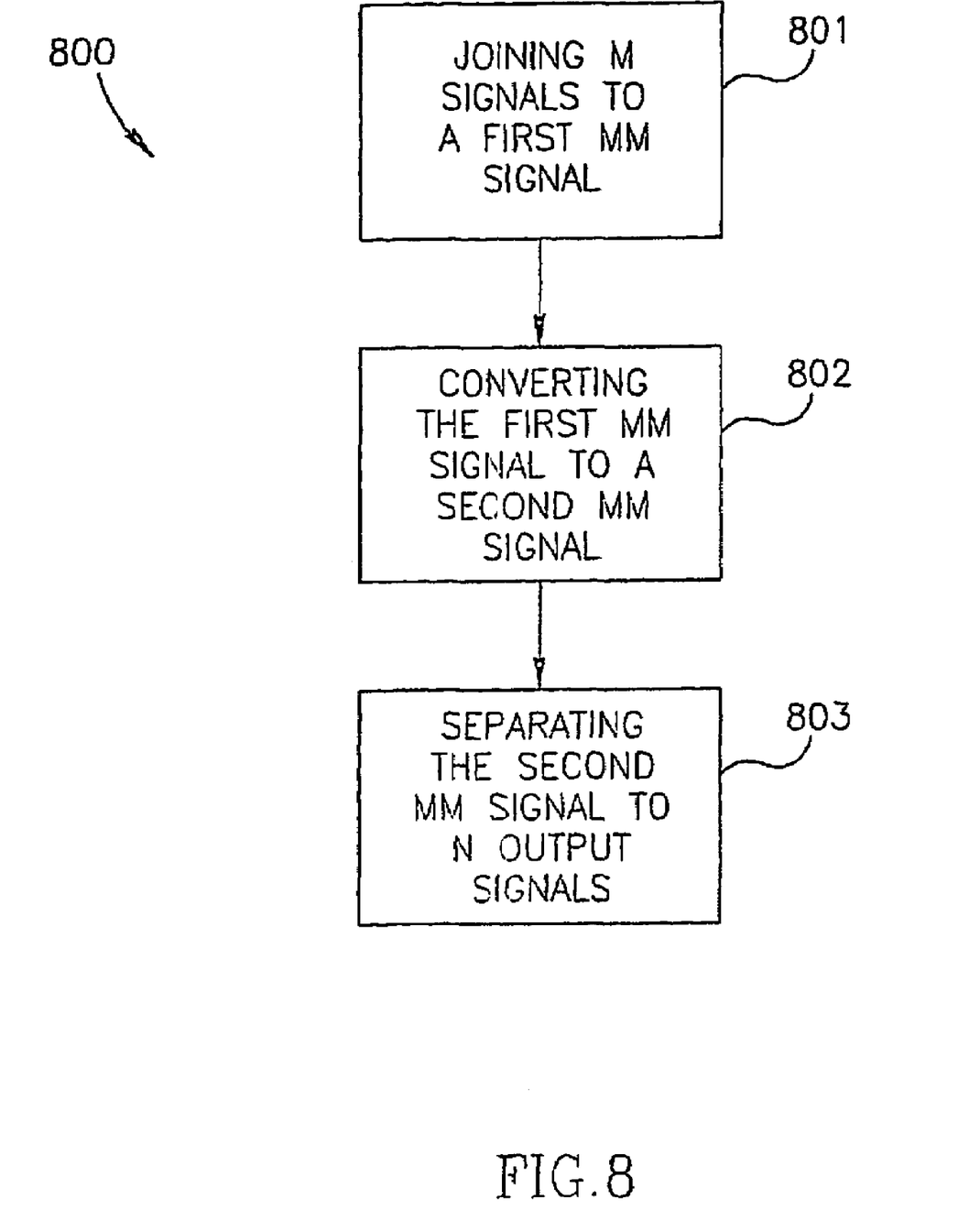
FIG. 8 is a schematic block-diagram illustration of a method for switching M input signals into N output signals in accordance with exemplary embodiments of the invention.

FIG. 8 schematically illustrates a block-diagram of a method 800 of switching M input signals into N output signals, in accordance with exemplary embodiments of the invention.

Method 800 may begin with joining M input signals into a first MM signal having M initial modes, e.g. using a MDM and/or a beam combiner, as indicated at block 801.

The first MM signal may be converted, e.g., using a MC, into a second. MM signal having N converted modes, which may be different from the initial modes, as indicated at block 802.

Finally, the second MM signal may be separated, e.g., using a MDD and/or a beam splitter, into N SM output signals, as indicated at block 803.

According to embodiments of the invention, the converting of the first signal into the second signal may include dynamically controlling a relationship between the converted modes and the initial modes such that each one of the M input signals may be switched to one of the N output signals according to a desired scheme.

According to embodiments of the invention, the switches described above may use the difference between the initial mode-orders and the converted mode-orders to provide various switching functions, for example, the variety of switching functions described herein. Since each of the mode-orders may have significantly different optical properties, e.g., effective refractive index, a relatively high level of separation between the output ports of the switch may be achieved, e.g., a high ratio between the power of a signal exiting an intended output of the switch and the power of signals exiting unintended outputs of the switch.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. An optical switching device for switching M input signals into N output signals, wherein M and N are each equal to or greater than one, comprising:
   a mode division multiplexer to join said M input signals into a first multi-mode signal having M initial mode orders by converting each of said M input signals into a respective one of said M mode orders;
   a mode converter to convert said first multi-mode signal into a second multi-mode signal having N converted mode orders; and
   a mode division demultiplexer to separate signals on said N mode orders of said second multi-mode signal respectively into said N output signals,
   wherein said converter is able to be controllably activated such that said N converted mode orders are separated by said demultiplexer to said N output signals according to a desired scheme.

2. The device of claim 1 wherein said mode converter comprises a dynamic, controllable, mode converter able to convert at least a fraction of at least one of said M initial mode orders into a respective one of said N converted mode orders.

3. The device, of claim 1 wherein said mode converter comprises a long period grating mode converter.

4. The device of claim 1 wherein said mode converter comprises a splitter-based mode converter.

5. The device of claim 4 wherein said splitter-based mode converter comprises:
 a multi-mode input waveguide;
 a beam splitter associated with said multi-mode input waveguide, to split said first multi-mode signal into a first component propagating through a first single mode waveguide and second component propagating through a second, substantially parallel, single mode waveguide;
 first and second controllable phase shifters associated with said first and second single mode waveguides, respectively; and
 a combiner to combine said single mode signals into an output multi made waveguide,
 wherein said first and second phase shifters are able to be controllably activated to create a desired phase shift between said first and second components to convert at least a predetermined fraction of a first mode-order of said input signal into a second mode-order of said output signal.

6. The device of claim 1 wherein said mode converter comprises a cascaded set of sub-converters, each sub-converter adapted to convert at least one mode order of said M initial mode orders into a corresponding mode order of said N converted mode orders.

7. The device of claim 1 further comprising a multi-mode waveguide to connect said mode division in multiplexer to said mode converter.

8. The device of claim 1 further comprising a multi-mode waveguide to connect said mode converter to said mode division demultiplexer.

9. The device of claim 1 wherein M is equal to one, and wherein said mode division multiplexer comprises a waveguide expander to adiabatically expand a single mode waveguide input of the waveguide expander into a multi-mode waveguide output of the waveguide expander.

10. The device of claim 1 wherein both M and N are equal to two.

11. The device of claim 10 wherein said mode converter is adapted to switch between two mode orders of said first multi-mode signal.

12. The device of claim 11 wherein said two mode orders are a zero-order mode and a first-order mode, respectively.

13. A variable optical attenuator comprising the device of claim 1, wherein M is equal to one, and wherein said converter is controllably activated to transmit a desired attenuated fraction of said input signal to a predetermined output signal of said N output signals.

14. The device of claim 13, wherein said variable optical attenuator Is normally dark and wherein said attenuated fraction equals substantially zero when said converter is not activated.

15. The device of claim 13, wherein said variable optical attenuator is normally bright and wherein said attenuated fraction equals substantially the full intensity of said input signal when said converter is not activated.

16. An optical 2×2 switching device for switching a single-mode input signal entering one of two single-mode input waveguides, into one of two single-mode output waveguides, comprising:
 a Y-coupling branch structure associated with said input waveguides to combine said input signal to an initial multi-mode signal, having two mode orders;
 a mode division demultiplexer to drop one of said two mode orders and to produce first and second single-mode signals propagating through first and second MD single-mode waveguides, respectively;
 first and second controllable phase shifters associated with said first and second MD single mode waveguides, respectively;
 a mode division multiplexer to combine said first and second single mode signals into a converted multi-mode signal; and
 a splitting Y-branch structure to direct said converted multi-mode signal to one of said two single-mode output waveguides,
 wherein said first and second phase shifters are able to be controllably activated to create a desired phase shift between said first and second single-mode signals, such that said splitting structure directs said converted multi-mode signal to a desired output waveguide of said two single-mode output waveguides.

17. The switching device of claim 16 wherein said first and second controllable phase shifters comprise first and second heating elements, respectively.

18. A variable optical attenuator comprising the switching device of claim 16 wherein said first and second phase shifters are activated to cause the switching device to transmit a desired attenuated fraction of said input signal to said desired output waveguide.

19. A variable optical attenuator according to claim 18 wherein said attenuated fraction is equal to substantially the full intensity of said input signal one when said phase shifters are not activated.

20. A variable optical attenuator according to claim 18 wherein said attenuated fraction equals substantially equals zero when said phase shifters are not activated.

21. The variable optical attenuator of claim 18 wherein said desired phase shift is between 0 radians and $\pi$ radians.

22. A method of switching M input signals to N output signals, wherein M and N are each equal to or greater than one, comprising:
 joining said M input signals into a first multi-mode signal having an initial set of M mode orders by converting each of said M input signals into a respective one of said M mode orders;
 converting said first multi-mode signal into a second multi-mode signal having a converted set of N mode orders and
 separating signals on said N mode orders of said second multi-mode signal respectively into said N output signals.

23. The method of claim 22 wherein convening said first multi-mode signal into said second multi-mode signal comprises dynamically controlling a relationship between said converted mode orders and said initial mode orders, such that each one of said M input signals is controllably switched to one of said N output signals.

24. The method of claim 22 wherein converting said first multi-mode signal into said second multi-mode signal comprises activating a long period grating perturbation pattern.

25. A splitter-based mode converter for convening an input MM signal into a MM output signal comprising:
 a multi-mode input waveguide;
 a beam splitter, associated with said multi-mode input waveguide, to split said input MM signal into a first component propagating through
 a first single mode waveguide and a second component propagating through a second, substantially parallel, single mode waveguide, respectively;

first and second controllable phase shifters associated with said first and second single mode waveguides, respectively; and
a combiner to combine said single mode signals into an output multi mode waveguide,
wherein said first and second phase shifters are able to be controllably activated to create a desired phase shift between said first and second components to convert at least a fraction of a first mode-order of said input signal into a second mode-order of said output signal.

* * * * *